Dec. 4, 1956    H. W. BRUNE ET AL    2,772,701
PROCESS AND APPARATUS FOR THE MANUFACTURE OF WIRE NETTING
Filed Oct. 12, 1951    12 Sheets-Sheet 1

INVENTOR
Heinrich W. Brune
Herbert Hädrich
Kurt Böhm
BY
Cushman, Darby & Cushman
ATTORNEY.

Dec. 4, 1956  H. W. BRUNE ET AL  2,772,701
PROCESS AND APPARATUS FOR THE MANUFACTURE OF WIRE NETTING
Filed Oct. 12, 1951  12 Sheets-Sheet 3
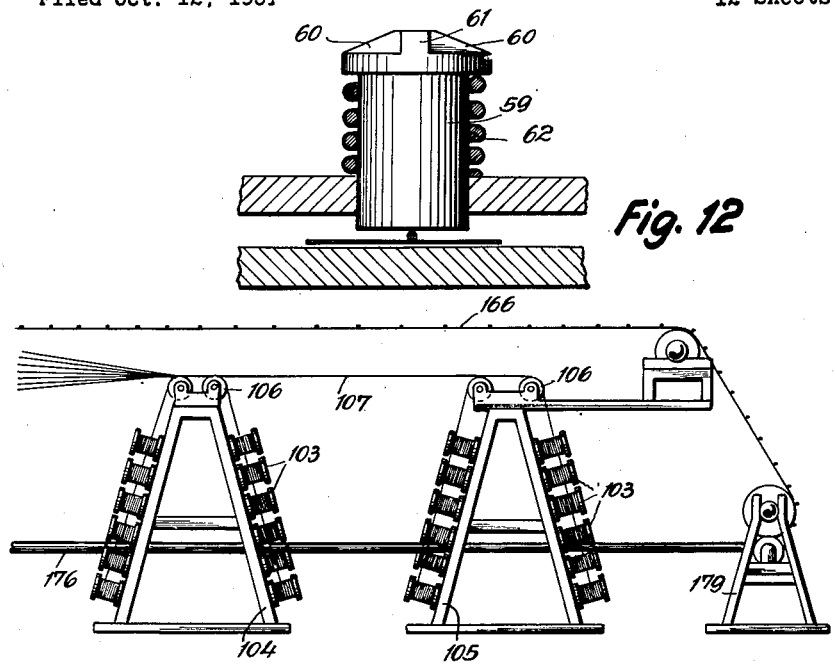
Fig. 12
Fig. 14
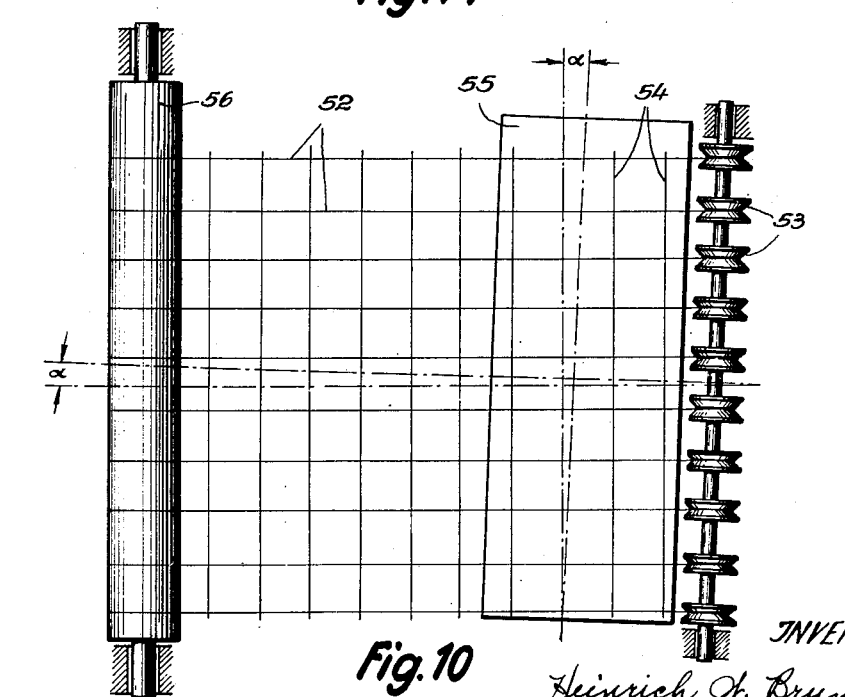
Fig. 10
INVENTOR
Heinrich W. Brune
Herbert Hädrich
Kurt Böhm
BY Cushman, Darby & Cushman
ATTORNEY.

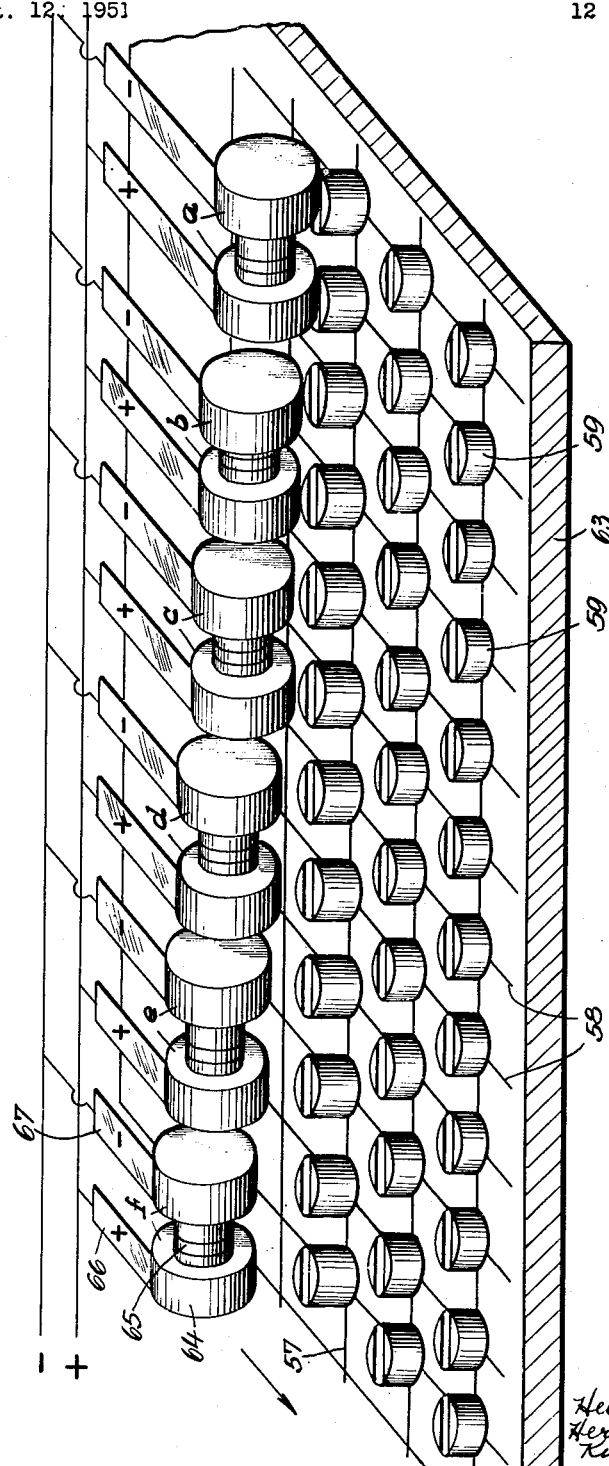

Dec. 4, 1956  H. W. BRUNE ET AL  2,772,701
PROCESS AND APPARATUS FOR THE MANUFACTURE OF WIRE NETTING
Filed Oct. 12, 1951  12 Sheets-Sheet 6

INVENTOR
Heinrich W. Brune
Herbert Hidrich
Kurt Böhm
BY
Cushman, Darby & Cushman
ATTORNEY.

INVENTOR
Heinrich W. Brune
Herbert Hädrich
Kurt Böhm
BY Cushman, Darby & Cushman
ATTORNEY Dec. 4, 1956     H. W. BRUNE ET AL     2,772,701
PROCESS AND APPARATUS FOR THE MANUFACTURE OF WIRE NETTING
Filed Oct. 12, 1951

United States Patent Office 2,772,701
Patented Dec. 4, 1956

2,772,701

PROCESS AND APPARATUS FOR THE MANUFACTURE OF WIRE NETTING

Heinrich Wilhelm Brune, Herbert Hädrich, and Kurt Böhm, Dorsten, Germany

Application October 12, 1951, Serial No. 251,008

Claims priority, application Germany May 29, 1951

5 Claims. (Cl. 140—112)

This invention relates to the manufacture of netting from steel wire, iron wire or other suitable weldable material.

More particularly the invention relates to the manufacture of wire netting in the form of endless lengths or in any desired lengths consisting of longitudinal wires which correspond to the warp threads in fabrics or the like and transverse wires crossing these (corresponding to the weft threads of the fabric) the longitudinal and transverse wires being welded together at the crossing points. Hitherto such wire netting was manufactured by stretching the longitudinal wires, drawn out for example from a series of separate wire spools, over a fixed table-like support, the transverse wires being laid thereon and welding then being effected. In the known process there was employed for applying the transverse wires onto the longitudinal wires a thread guiding or gripping member passing backwards and forwards over the width of the netting to be produced, operating similarly to the thread gripper in a shuttleless loom. The periodically repeated braking and re-acceleration of the thread guiding or gripping member required for this purpose and the stepwise advancement of the longitudinal wire required in conjunction therewith provides however, considerable disadvantages from the point of view of construction and operation.

A primary object of the invention is to provide a new and improved process and apparatus for the manufacture of the said wire netting which permits a continuous movement of the longitudinal and transverse wires and thereby produces a considerable increase in the output of the machine.

Other important objects of the invention will be evident from the following detailed description of the invention.

The process according to the invention for the manufacture of wire netting consists essentially in that the longitudinal wires are laid over a fixed support, which may be of annular or polygonal cross section, in a closed series and that the transverse wires are wound singly or in multiples about the series of longitudinal wires on the support, in the same or the opposite direction and with a constant or varying angular direction, and are then welded, preferably electrically, to the longitudinal wires at the crossing points.

In this manner there is obtained first of all a tubular wire network which is then cut at one or more points in the length and then opened out.

The process according to the invention can be carried out continuously thus providing a large output capacity in the installation, the manufacturing costs being low in proportion to the output.

With the continuous method of operation according to the invention the longitudinal wires are drawn over the welding support at a substantially constant speed and the welding electrodes are pressed on the crossing points for a short time, with closing of the current supply, the crossing points being welded in one part only of the longitudinal wires in each time period. The movement of the welding electrodes can be effected according to the invention either mechanically, electromagnetically, pneumatically or hydraulically.

The new process can be carried out in various ways, for example an annular support can be employed, the longitudinal wires being first of all laid in the hollow of the annular body so that they may then be guided over reversing rollers on to the outside of the annular body. The winding with the transverse wires is then effected, this being either drawn from moved rollers or reels or being laid by gripper arms or other suitable means about the longitudinal rows of wire.

The reels of the transverse wires can according to the invention be arranged on a carrier enclosing the annular support or the like for the longitudinal wires; the wire reels for the transverse wires may however, also be arranged on a special frame and merely allow wire guides to pass around the longitudinal wires on the annular support.

The wire guides or wire reels may also be moved by means of endless conveyor belts or the like and held around the support for the longitudinal wires.

The tubular network withdrawn from the support after the welding of the longitudinal and transverse wires is according to the invention preferably cut at two opposite points and then spread out, this conveniently being effected by means of suitable straightening and bending rollers. There is then formed a flat strip of netting which is wound up in the usual manner and then cut off in the requisite lengths.

In order to weld the longitudinal wires with the transverse wires at the crossing points there is employed according to the invention the known electrical resistance welding. The support which serves to carry the windings of the longitudinal wires with the transverse wires is utilised as a welding table. It is made of a material which is a good conductor for electricity.

The support according to the invention may however, also be made from electrical non-conducting material in which metal bodies are inserted at certain points on which the crossing points to be welded will come to rest at the moment of welding. The counter electrode may be in any suitable form. It may for example, consist of a roller but preferably a number of roller electrodes are provided which are brought into action successively at various crossing points. Another preferred form of construction of the welding apparatus according to the invention consists in using segmental electrodes which at the moment at which the crossing points to be welded come into their range of movement are pressed on to the crossing points by means of a pressure device preferably controlled by the revolving carrier of the wire reels or wire guides.

The longitudinal wires may move relatively to the welding support during the welding operation. The movement of the longitudinal wires may however, also be carried out in steps. Preferably the invention employs continuous movement of the longitudinal wires.

The drawing illustrates several forms of construction of the invention in which:

Figs. 1 to 3 each show a cross section through various hollow formers for the support over which the endless series of longitudinal wires is passed, Fig. 4 shows partly in side elevation and partly in section an apparatus for guiding the wire in the process according to the invention, Fig. 5 shows the apparatus for cutting up, spreading out and winding up the prepared welded netting in side elevation, Fig. 6 is a plan of this apparatus, Fig. 7 shows another form of construction, in side elevation, of the apparatus preferably employed for carrying out the process according to the invention, Fig. 8 shows diagrammatically the construction of a third form of construction of the apparatus in side elevation, Fig. 9 shows the apparatus according to Fig. 8 in plan, Fig. 10 shows the apparatus for the manufacture of netting with square meshes, Fig. 11 shows the arrangement of a number of roller electrodes for welding the wire crossing points, Fig. 12 shows a contact pin, Figs. 13a and 13b and 14 show another form of construction of the apparatus according to the invention in side elevation, Fig. 15 shows an apparatus for winding up the finished netting coming from the apparatus according to Figs. 13 and 14, Fig. 16 shows the side elevation of the apparatus according to Fig. 15, Fig. 17 shows to a larger scale a development of the welding bed with electrodes for the apparatus according to Figs. 13 and 14, Fig. 18 shows to a larger scale a side elevation of a part of the apparatus according to Figs. 13 and 14 together with the electrical conection diagram, Fig. 19 shows to a larger scale the arrangement of welding electrodes and welding bed, partly in section and partly in elevation, Fig. 20 shows another section through the arrangement according to Fig. 19, Fig. 21 shows a section through the wire guiding slots, Fig. 22 shows the side elevation of a part of the apparatus according to Figs. 13a, 13b and 14.

Figure 1:
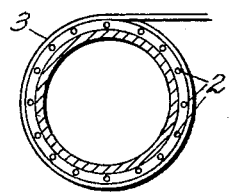

In the apparatus according to Fig. 1 there is provided an annular support 1 over which a closed series of longitudinal wires 2 is passed, this extending in the region of the periphery of the annular body 1 parallel to the longitudinal axis thereof.

The transverse wire 3 is wound externally or outwardly about the longitudinal wires 2 on the annular support 1 whilst simultaneously the longitudinal wires are drawn forward so that the transverse wire lies in helical lines about the series of longitudinal wires. It is essential here that a relative movement takes place in the longitudinal direction of the wires 2 between the longitudinal wires and the transverse wires 3.

Figure 2:
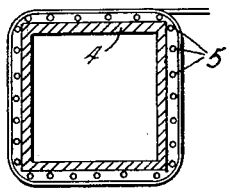
Figure 3:
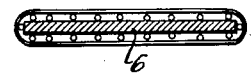

In the apparatus according to Fig. 2 the support for the longitudinal wires 5 is substantially square whilst the support 6 according to Fig. 3 is rectangular or approximately plate shaped. The form of the support does not affect the invention so long as the support is provided so that a closed series of substantially parallel longitudinal wires is formed and the transverse wires are wound externally about this closed series of longitudinal wires.

Figure 4:
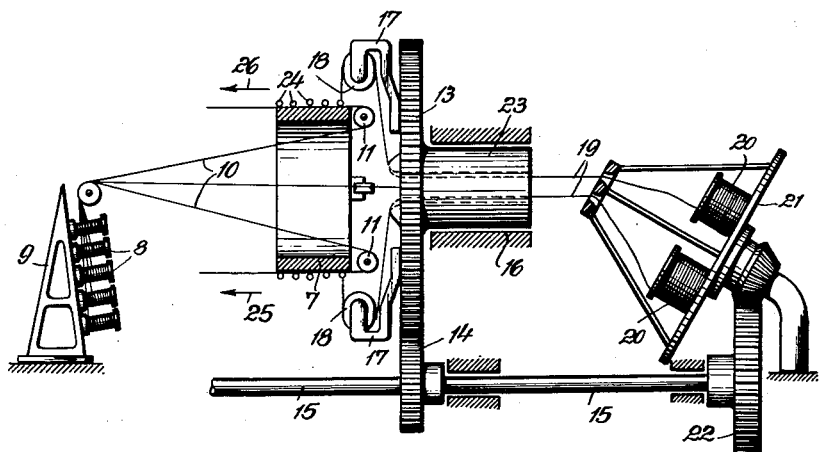

In the form of construction according to Fig. 4, there is provided an annular support according to Fig. 1. The longitudinal wires are here drawn from wire reels 8 which are arranged on a stationary frame 9. The longitudinal wires 10 are then first of all led through the hollow of the support 7 and then pass over guide rollers 11 in the direction of the arrow 25.

On the other side of the support 7 which is held stationary as for example by means of supporting arms, not shown, which lie in the spaces between the wires 10, there is arranged a carrying frame 13 which extends co-axially to the support 7 and can be rotated by means of rollers 14 by the shaft 15. A bearing 16 serves to support the carrier 13.

On the support 13 there are provided a number of arms 17 for the wire guiding rollers 18. To these wire guiding rollers wire 19 is fed from reels 20 which are arranged on a rotary supporting plate 21 which can be rotated by means of the disc 22 from the shaft 15.

In order to wind the transverse wires 19 in accordance with the invention externally on to the longitudinal wires 10 in the region of the support 7 the carrier 13 is allowed to rotate whilst an unwinding of the transverse wires 19 led through the hollow of the support part 23 is prevented by synchronous rotation of the reel carrier 21.

In the apparatus illustrated in Fig. 4 two wire guides 18 are employed. On this account the transverse wires are placed about the longitudinal wires in a multiple screw thread line.

The crossing points of the transverse wires (see 24) wound about or over the longitudinal wires are welded in the region of the support 7 in the manner to be described hereafter.

Figure 5:
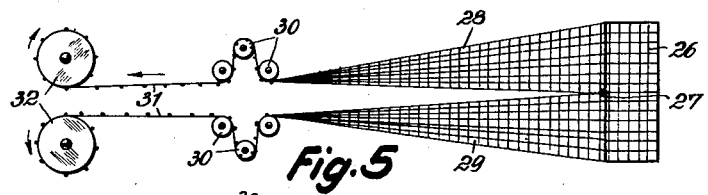

In this way there is formed a tubular netting which is drawn off from the support 7 in the direction of the arrow 25 and indicated at 26 in Fig. 5. This tubular netting is then cut at two opposing points by means of two cutting devices 27 whereby two substantially semi-circular parts 28, 29 are formed which are then opened out and passed over flattening rollers 30 so that a flat wire fabric is formed as indicated at 39. The two lengths of fabric 31 are finally passed over the winding drums 32 and wound thereon in the known manner.

Figure 7:
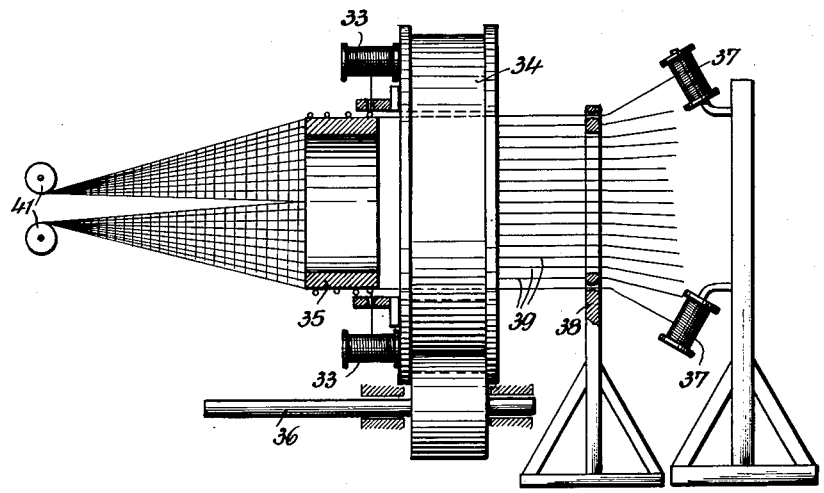

In the apparatus according to Fig. 7, the wire reels 33 for the transverse wires are arranged on a rotary carrier 34 which is arranged co-axially to the support 35, in this case also of annular construction and rotated by the driving shaft 36. The longitudinal wires are drawn from the reels 37. They then pass through a wire guide 38 which has as many holes therein as there are longitudinal wires 39 so that behind the wire guide 38, the longitudinal wires extend in a closed series which is drawn over the support 35. By rotating the coil carrier 34 the transverse wire or wires is or are wound about the longitudinal wires during the forward movement of the longitudinal wires over the support.

After welding of the crossing points the tubular netting is divided by means of the cutting devices 40 and led to the flattening rollers 41 which operate in the same way as the rollers 30 according to Fig. 5. The wire fabric thus opened out flat can then be wound in the described manner.

Figure 8:
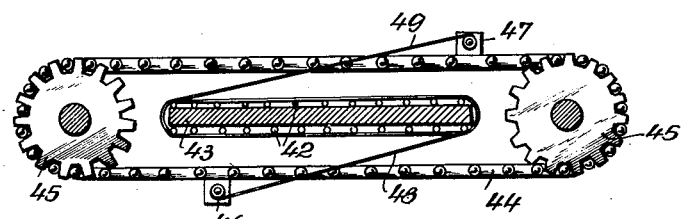

In the apparatus according to Fig. 8 the closed series of longitudinal wires 42 is led over a support 43 which is rectangular or plate shaped in cross section. About this support there run on guide tracks not illustrated two endless link belts 44 which are kept in tension and in movement by the sprocket wheels 45. Between the link belts 44 there are arranged in the form of construction illustrated two wire reels or coils 46 and 47 which each deliver a wire 48, 49.

Figure 6:
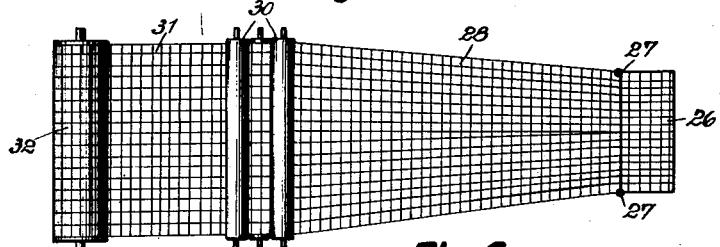
Figure 9:
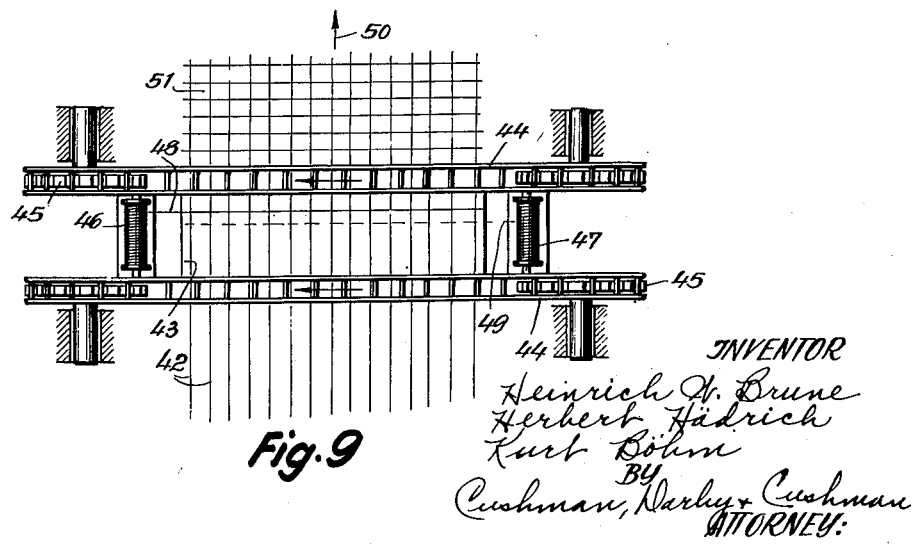

The longitudinal wires are moved continuously in the direction of the arrow (Fig. 9) over the plate shaped support 43. During this the wire coils 46, 47 rotate about the support and the closed series of longitudinal wires 42. In this way, the wires 48, 49 are wound externally of the longitudinal wires 42 along the path of a two-start screw, so that after welding of the wire crossing points, a network is formed as indicated at 51. This network 51 is then, in the same manner as described in connection with Figs. 5-7, cut at one or both sides and opened out so that two flat lengths are formed. If required, the hook shaped, bent over portions of the transverse wires formed at the longitudinal edges of the strips may be additionally flattened or cut off.

In order to produce an accurately square network the longitudinal wires 52 in the apparatus according to Fig. 10 are not withdrawn over the guide rollers 53 at an angle of 90° to the guide roller axis but at an angle which is smaller than 90° by the angle. The angle corresponds to the angle of inclination of the transverse wires arranged in a helical line. The axis of the winding drum 56 is displaced by the same angle. Thus it is immaterial whether welding is carried out in the round or in the flat. With a double table arrangement and with round welding, the axes of the winding drums are displaced in opposite directions by the angle.

An effective square network may also be produced according to the invention by means of the following process.

The wire coils 46, 47 (Fig. 8) are so supported that they are movable in the direction of movement of the longitudinal wires 42. By means of a guiding sheet they receive during the application of the transverse wires an advancement in this direction which is equal to the inclination multiplied by the number of the simultaneously applied transverse wires.

The welding of the longitudinal and transverse wires at the crossing points can be carried out in various ways; preferably the invention employs welding by means of roller electrodes or segmental electrodes.

The welding with roller electrodes is shown in Fig. 11. Here there is indicated at 63 a part of the support on which the closed series of longitudinal wires 57 is formed, crossed by the transverse wires 58. The contact bolts 59 are resiliently carried in a support, not illustrated, so that they are about 2 mm. over the crossing points in the rest position. Fig. 12 shows the construction of a contact bolt 59. The head is provided with two insulated zones 60 and a contact zone 61 lying therebetween. About 4/5 of the insulation zones are inclined planes.

The contact rollers 64 are mounted on a carrier, not shown, which moves in the direction of the arrow (Fig. 11). The insulating layer 65 separates electrically the two rollers of a pair of rollers. Sliding contacts 66, 67 connect the contact rollers 64 to the secondary side of a transformer which is arranged on the carrier of the contact rollers (not shown). The primary current is supplied to the transformer by slidebars.

Preferably a current bridge connection is employed so that two crossing points can be welded at a time. If the carrier of the double rollers (contact rollers) is moved in the direction of the arrow a double roller presses two contact bolts against two crossing points. After passing over the first insulation zone 60 the roller contacts the contact zone 61 and welding is effected. The roller then reaches the second insulation zone 60 and the current flow is here suspended but the pressure on the welding point remains for a short time as a small part of the second insulation zone lies in the plane of the contact zone. The roller then moves away from the second insulation zone 60 and the contact bolt is raised by spring pressure from the welding point.

The welding operation lasts for about 1/50 to 1/100 of a second; for example the welding period may be 1/50 of a second with an interval between successive crossing points of 10.5 mm. If the contact zone 61 of the bolts is 2.1 mm. wide it is traversed by the roller in about 1/50 of a second. Accordingly the distance of 10.5 mm. to the next crossing point has to be traversed in 10.5 x 1/50 of a second=0.21 second in the no-load condition of the transformer. In order to avoid this no-load condition of the transformer the invention provides for the employment of multiple pairs of rollers. Their number is derived from the ratio of the width of the meshes to the breadth of the welding zone. If the mesh width is 12.5 mm. and the breadth of the welding zone is 2.1 mm. six pairs of rollers are employed. In order not to interrupt the flow of current the welding zones of the contact bolts must have a breadth of 12.5 mm./6=2.08 mm., that is, about 2.1 mm.

The support of the contact rollers on the carrier is arranged so that the axes of the contact rollers are displaced by about 2 mm. as indicated in Fig. 11. Shortly before the double roller (contact roller) a leaves the welding zone 61 of its contact bolts the double roller (contact roller) b reaches the welding zone 61 of the contact bolts controlled by it. The same takes place in succession with the double rollers c, d, e, f and from f back again to a. The working operation then begins afresh.

According to the invention the welding may also be carried out with segment shaped electrodes having substantially the shape of long plates which engage a group of, for example, 16 wire crossing points. The necessary number of such segment electrodes is distributed radially to the annular support over the periphery thereof. The control of the segments is effected by means of a roller head which is connected with the rotating wire guiding carrier 13 (Fig. 4). In addition, the supply of current may be effected through copper rollers whilst the welding pressure is exerted by steel rollers. Another form of construction according to the invention provides for the employment of rollers consisting of a particularly hard conducting material so that these rollers exert the welding pressure as well as carrying the current supply. In both cases the current control is operated by means of a special switching installation. The electrode plates are, as soon as the wire crossing points to be welded come within their range of movement, moved against the support until they meet the wire crossing points and press the wires together. The electrodes are then energised and welding is effected whereafter the electrodes are withdrawn by spring pressure into their original position.

Where segmental electrodes are employed it is also preferable to bring the electrodes into operation successively as described in the case of the roller electrodes in order to be able to use the welding transformer to the full.

The apparatus according to the invention illustrated in Figs. 13a–24 has an an annular stationary welding bed 100 which is held on both sides by supports 101. Concentrically to the welding bed 100 there is arranged on the frame 101 an annular body 102 which carries the movable welding electrodes.

The longitudinal wires are withdrawn from coils 103 which are rotatably mounted on two or more frames 104, 105. The wires withdrawn from the coils are fed over rollers 106 which are arranged so that the longitudinal wires 107 lie adjacent each other at substantially equal intervals.

From the guide rollers 106 the wires pass to rollers 108 (Fig. 20) which are arranged on the inner edge of the annular welding bed and from which the wires are led to a roller 109 which lies on the upper edge of the welding bed. The longitudinal wires are thus introduced into the hollow space of the annular welding bed and withdrawn over the outer periphery thereof. The arrangement of the longitudinal wires and of the rollers 108, 109, is such that the longitudinal wires lie distributed about the periphery of the annular welding bed at equal intervals.

Adjacent the stationary welding bed 100 there is rotatably mounted a wheel-shaped coil carrier 110 on the frame bed 111. The wheel member 110 is driven by means of a friction wheel 112 through the shaft 113 and a transmission gearing, preferably adjustable, from a motor 114.

On the wheel member there is provided the required number of wire coils 115 from which the transverse wires are drawn. For example four coils 115 may be provided on the wheel member 110 and in this case with one rotation of the wheel member four windings are simultaneously wound about the closed series of longitudinal wires.

Figure 20:
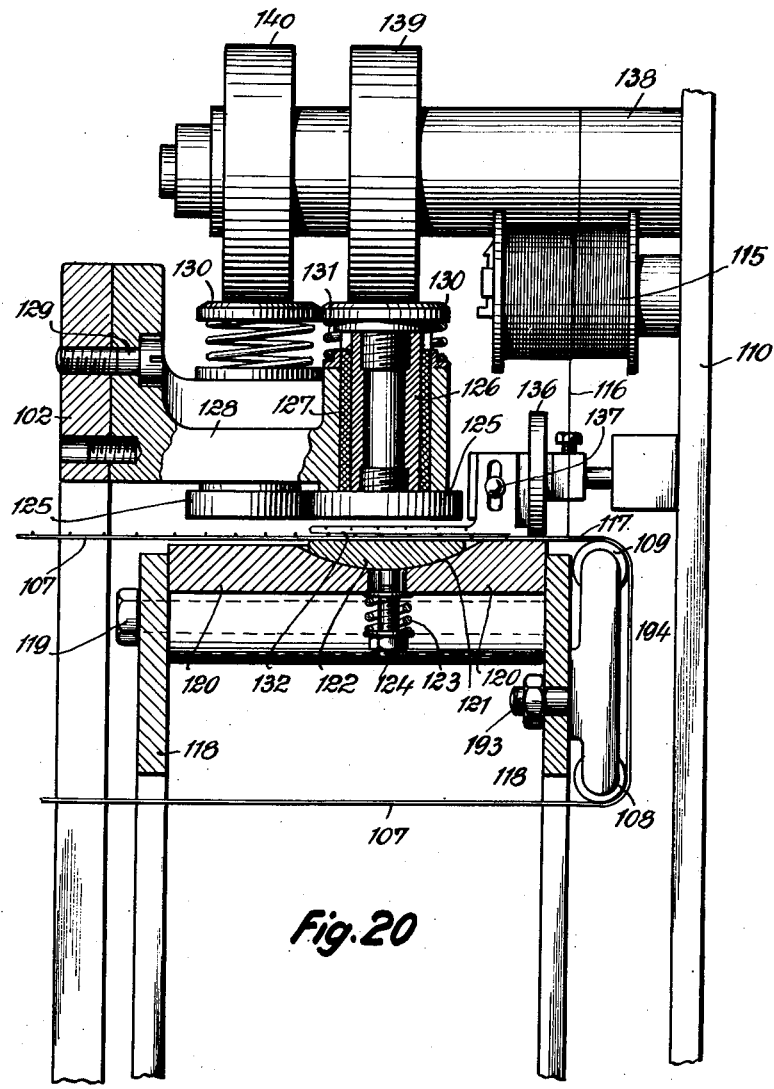
Figure 21:
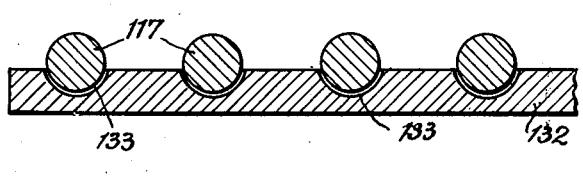

Fig. 20 shows more clearly the arrangement of the wire coils 115 on the wheel member 110. 116 indicates a transverse wire withdrawn from the coil, this being wound at 117 about the longitudinal wire 107.

Figure 18:
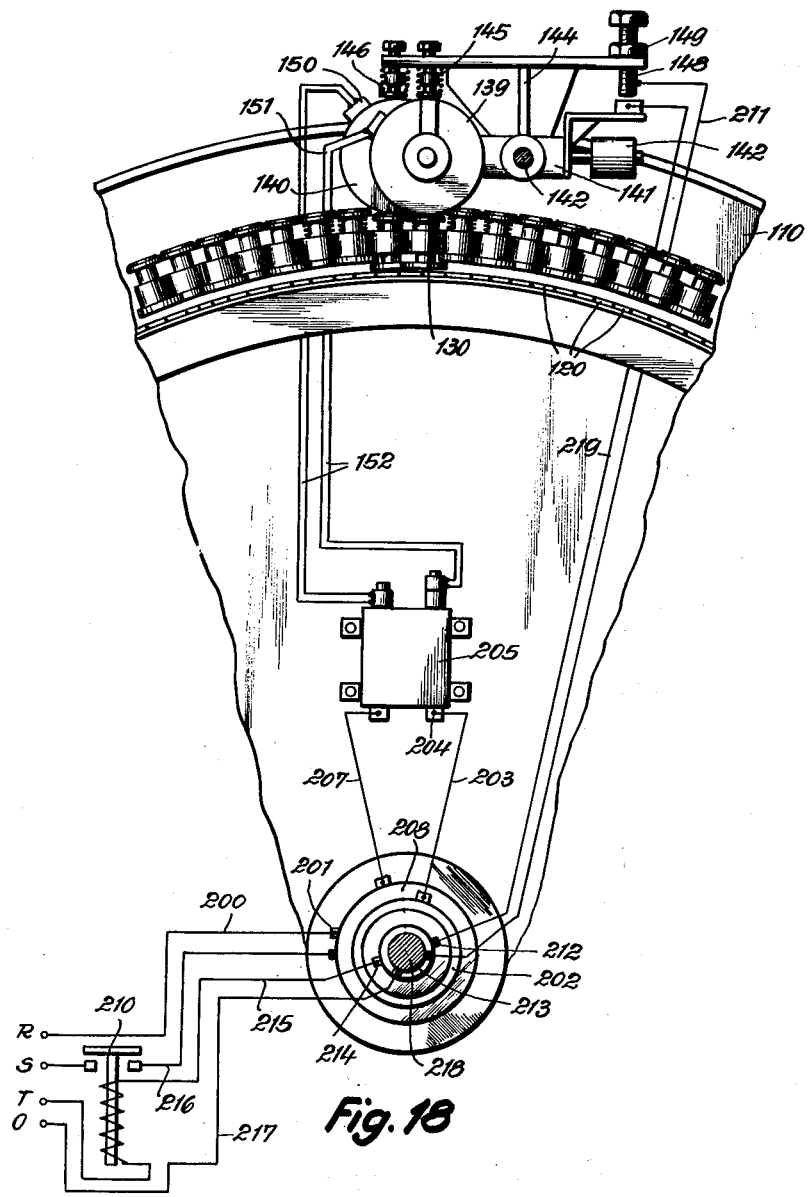
Figure 19:
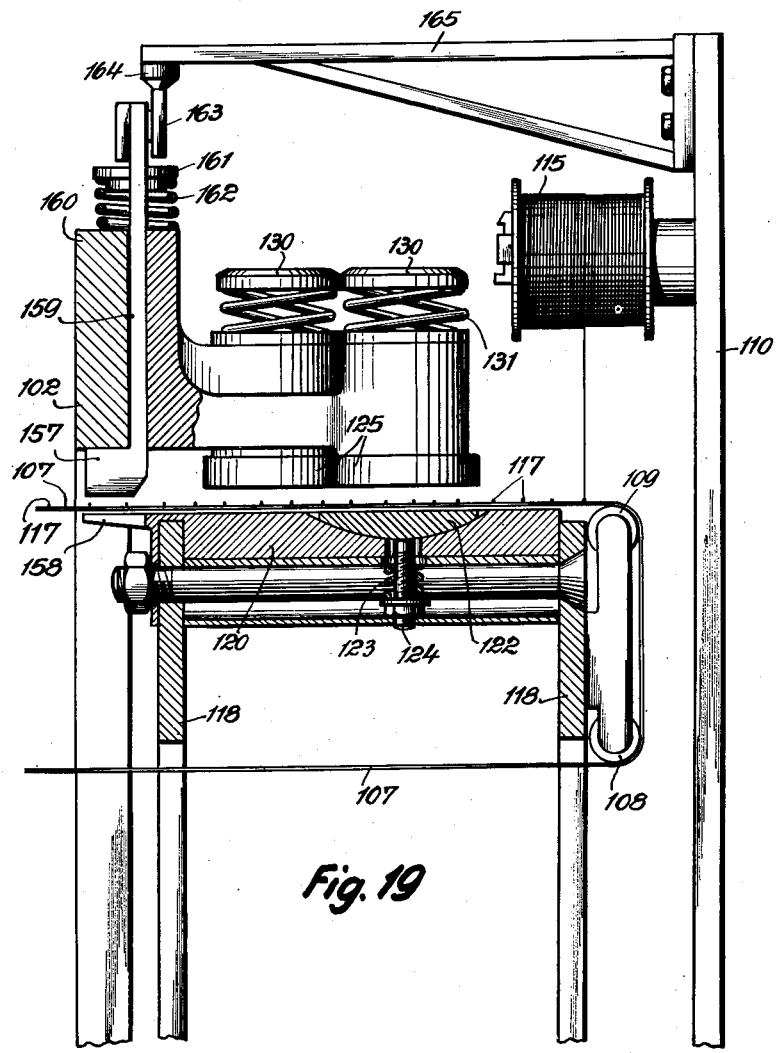

The stationary welding bed consists of two annular parts 118 for example of sheet steel which are connected with each other by means of screws 119 and hold between them flat metal pieces 120 so that the outer surface of the welding bed is polygonal, see also Fig. 18. The metal members 120 have one or more recesses 121 which may be dome shaped. In each of them is arranged a metal member 122 having the shape of a section of a sphere and pivotally held in the recess 121 by the spring 123 which cooperates with a bolt provided with nuts, which is fixed on to the metal body 122.

The metal body 122 forms the welding support for the movable electrodes. As the metal body 122 can pivot to a certain extent in its seat the shape and position of its surface can accurately adapt itself to the position at any time of the movable welding electrodes during the welding operation. On this account it can be ensured that during welding all the crossing points of the longitudinal and transverse wires lying within the range of the electrodes and engaged thereby are held under practically the same compression and at the pressure most favourable for the welding operation.

Figure 17:
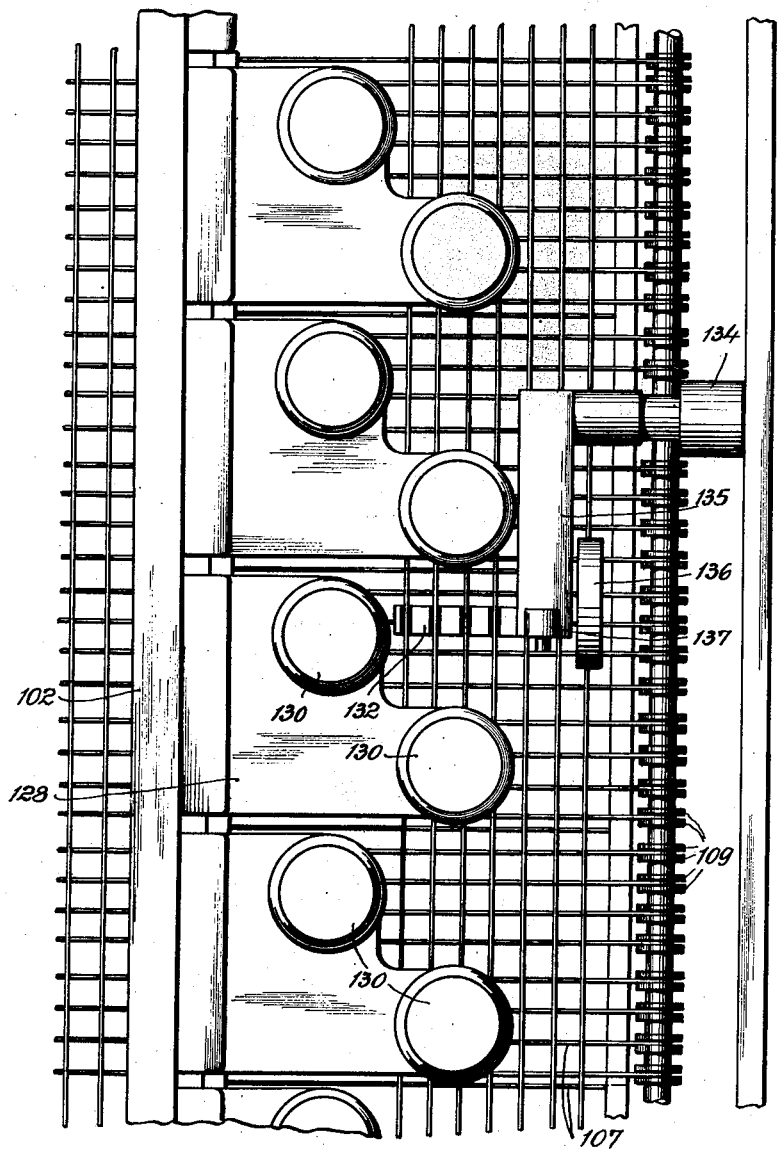

In the form of construction illustrated there are provided in the stationary welding bed two annular series of welding supports 122 these being staggered with respect to each other in the two adjacently extending series as indicated in Fig. 17.

Each welding support 122 is provided with a movable electrode 125 so that two adjacently lying annular series of movable welding electrodes are also provided.

The metal body of the welding electrodes 125 is held by a bolt 126 (Fig. 20) which is displaceable mounted in angular extensions 128 with the interposition of an insulating sleeve 127. The extensions 128 are fixed by means of screws 129 to the stationary electrode supports 102 each of the insulating members 120 having an extension piece 128.

The carrying bolt 126 of the electrode 125 projects upwardly from the sleeve 127 and has a head 130 against which a compression spring 131 acts from below and which holds the electrode when not loaded, in the position shown in Fig. 20. In this position there is a space between the electrode 125 and the welding support 122 through which the longitudinal wires 104 with the transverse wires 117 lying thereon can move freely. At the moment when welding takes place the electrode 125 is pressed against the welding support and the wires lying thereon. Through this operation however, the wire is only held for a short time so that in practice the continuous forward movement of the longitudinal wires 107 and the transverse wires carried thereby on the stationary welding support is not affected.

In order to hold the transverse wires, which are wound about the circular series of longitudinal wires, in an accurate position relatively to each other and to the welding electrodes, there is provided as shown in Figs. 17 and 20 a guiding slide or movable member 132. This consists as can be seen from Fig. 21, of a flat part in the upper side of which there are provided a series of channel-shaped notches 133. In each of these notches of which there may be for example four, there is placed from the top one of the transverse wires 117.

The slide 132 thus lies between the transverse wires 117 and the longitudinal wires 107. It is held by a lever 135, pivotally mounted at 134 on the rotating wheel member 110 and on which there is also provided a guiding roller 136. This guiding roller 136 rests on the wire and thereby determines the height at any time of the slide 132 relative to the longitudinal wires 107, whilst the accurate positioning of the slide 132 can be adjusted by an adjusting screw 137 on the lever arm 135.

By means of this arrangement the slide 132, irrespective of the polygonal construction of the welding bed, follows accurately the surface of the insulating part 120 and the welding support 122 and the longitudinal wires 107 lying thereon and does not abut the latter during movement.

As can be seen from Fig. 20 in the form of construction illustrated the slide 132 is so arranged that it always holds four transverse wires in the region of the welding support 122.

On the rotating wheel member 110 there are in addition provided two or more arms 138 on which are rotatably mounted the rollers 139, 140. The rollers 139, 140 serve to press down the welding electrodes 125 one after the other during the rotation of the wheel member 110, the arrangement being such that when the pressure roller 139 presses down one of the electrodes 125 of the right hand series of electrodes (Fig. 17) the roller 140 actuates the next electrode of the left hand series of rollers lying behind in the direction of movement. The electrodes actuated by the two rollers 139, 140 thus weld simultaneously.

Preferably the invention employs two such pairs of rollers 139, 140 on the rotating wheel member 110. The provision of the rollers 139, 140 is shown more clearly in Fig. 18. Each of the rollers 139, 140 rests on an arm 141 which pivots about a bolt 142 provided on the wheel member 110. At the end of the double lever 141 there is provided an adjustable counter weight 143 which serves to equalise the weight of the respective roller, for example the roller 139 so that a quick reciprocation of the roller is possible.

From the bolt 142 or the rotating wheel member 110 there extends a frame 144 against which there are supported compression springs 145, 146 which serve to move the pressure rollers 139, 140 downwardly, overcoming the return springs 131 (Fig. 20) and thereby pressing the movable electrodes 125 against the welding support. As can be seen from Fig. 17 the pressure heads 130 of the electrodes in the two series of electrodes are spaced from each other. This has the effect that the pressure rollers 139, 140 upon lifting the pressure head 130 and before meeting the next pressure head move downwardly, this downward movement being assisted by the springs 145, 146. The lever 141 (Fig. 18) is therefore pivoted through a certain angle anticlockwise when the roller 139 leaves the pressure head 130 lying thereunder. As a result of this a contact 147 provided at the end of the lever 141 abuts a fixed contact member 148 which is adjustably fixed by means of bolts 149 on the frame 144.

As will be explained in more detail the switch formed for the contact members 147, 148 serves to switch on the welding current at the moment of the depression of the individually movable welding electrodes.

The rollers 139, 140 serve, in addition to supplying the mechanical depression of the movable welding electrodes, to supply the welding current to the welding electrodes. For this purpose movable current supplying shoes 150, 151 are provided, these being connected through connections 152 with the secondary side of the welding transformer 153 (Fig. 18). A welding transformer 205 is preferably provided for each pair of pressure rollers 139, 140. This is arranged on the rotating wheel member 110 so that it revolves with the pressure rollers 139, 140.

The method of operation of the apparatus described above is as follows:

The longitudinal wires 107 are drawn continuously over the fixed welding support. On rotation of the wheel member 110 the transverse wires 117 are then wound in a helical path about the closed series of longitudinal wires. The transverse windings pass successively in the region of the slide 132 which holds them in front of the first row of electrodes in such a way that four transverse wires always lie within the range of the electrodes 125 and the welding support 122. Behind the slide 132 the next electrode 125 is then depressed by the pressure roller 132 and the welding current is switched on for a short time, the welding of the wire crossing points then being effected. Directly thereafter the welding current is again broken until the pressure roller 139 engages on the next electrode or the pressure head. The slide 132 always urges the pressure roller 139 forwardly to such an extent that the transverse wires lie in the correct position during the welding operation.

In the actuation of the left hand electrodes (Fig. 17) a slide similar to 132 is not required as the wire crossing points under the right hand electrodes are already welded and the transverse wires are thus held in place.

From the stationary welding bed 100 there is therefore continuously drawn off an annular closed wire network consisting of longitudinal wires and transverse wires welded to the latter at the crossing points. This network is separated into two lengths at two diametrically opposed points by the apparatus shown in Fig. 119. This apparatus has a dividing knife 157 which co-operates with a counter-blade 158 fixed to the carrying ring 118 of the stationary welding bed. The blade 157 rests on a shaft 159 which is longitudinally displaceable in an extension 160 of the electrode carrying ring 102. The shaft 159 has a collar 161 against which the compression spring 162 acts so that the shaft is withdrawn until the rear side of the blade 157 abuts against the carrying body 102. In this position shown in Fig. 19 the wire network consisting of the longitudinal wires 107 and the transverse wires 117 is free and can be drawn forwards.

At the outer end of the blade shaft 159 there is provided a roller 163 which is within the range of movement of one or more stops 164 carried on a supporting arm 165 of the wheel member 110.

On rotation of the wheel member 110 the blade 157 is thus moved downwardly by the stops 164 into the range of the counter-blade 158, the wire between the blade 157 and the counter-blade 158 being cut through. For example, six such stops 164 can be provided on the wheel member 110 so that each blade in a complete revolution of the wheel member 110 carries out six cutting movements.

Figure 13A:
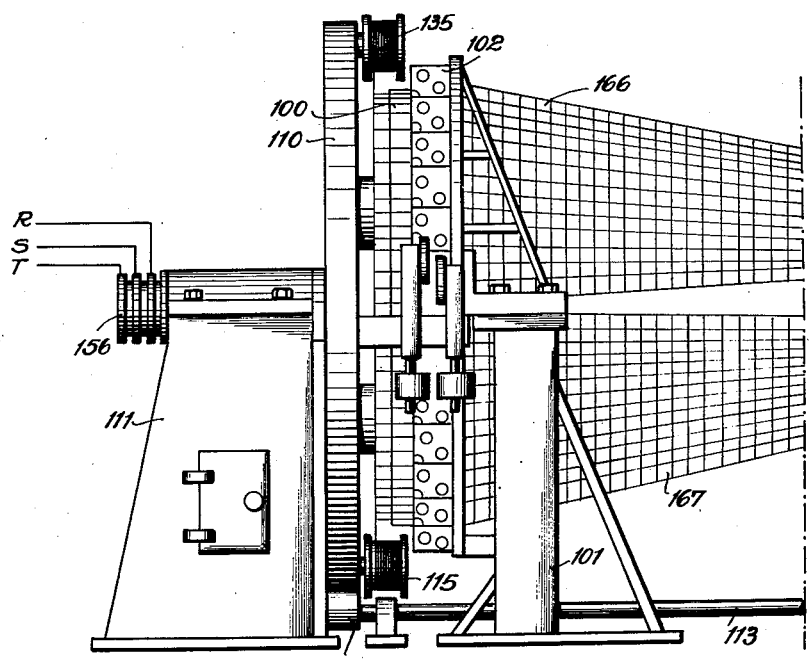
Figure 13B:
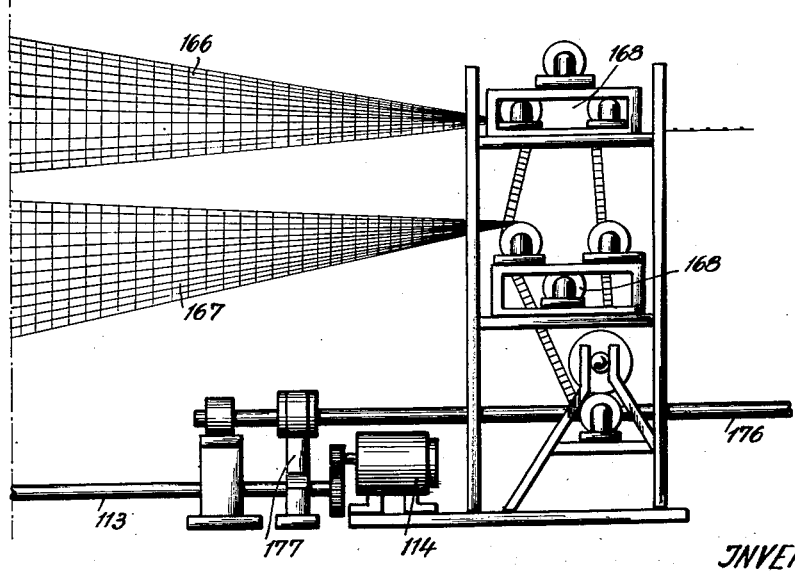

The blade 157 and its actuating mechanism are preferably arranged in a horizontal plane within the height of the upper side of the frame (Fig. 13). By means of the blade 157 the wire netting is therefore separated into two lengths 166, 167 as can be seen in Fig. 13. The two lengths then each pass into a yoke device 168 consisting of three rollers between which the lengths are caused to bend several times during passage therethrough so that the curve shape given by the annular welding support 100 is flattened and a flat netting is provided.

Figure 15:
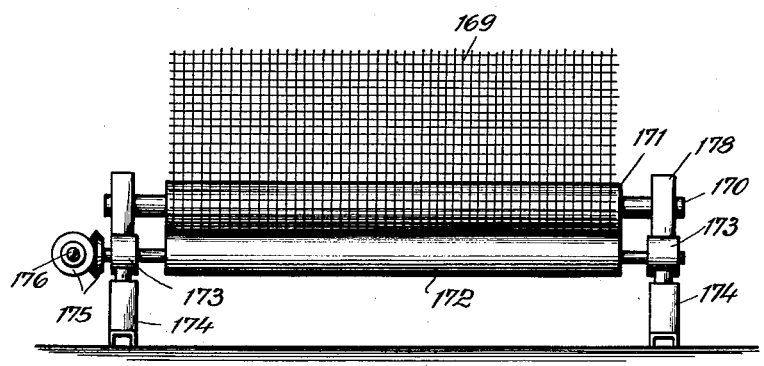
Figure 16:
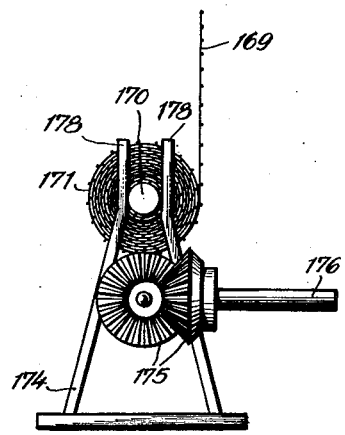

This flat or curved netting 169 then passes, as shown in Figs. 15 and 16 to a winding drum 170 on which the finished wire netting is wound to form a reel 171.

The winding roller 170 is driven by friction from a roller 172 which is carried in fixed bearings 173 of the frame 174 and is driven from the shaft 176 through the bevel wheel drive 175, the shaft 176 being itself connected (see Fig. 13) with the driving motor 114 of the apparatus through the gearing 177. The winding drum 170 is supported so as to be readily displaceable between the frame arms 178 so that it can accommodate the increasing diameter of the wire coil 17. The movement of the line of netting 169 is thus determined only by the speed of rotation of the friction roller 172.

As can be seen from Fig. 14 the upper length of netting 166 after leaving the bending apparatus 168 above the arrangement of reels 103 for the longitudinal wires is led backwards and wound on the winding device 179 which likewise receives its drive from the shaft 176 and is constructed according to Fig. 16.

Figure 22:
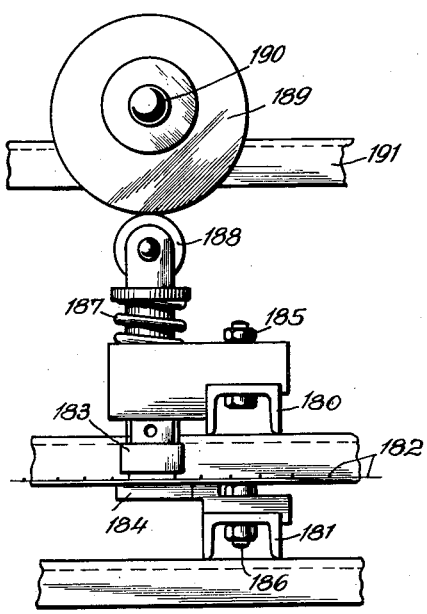
Figure 23:
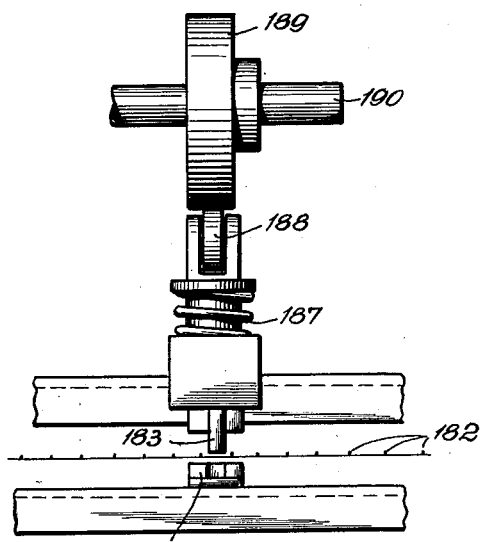
Fig. 23 is the end elevation of the same part as in Fig. 22.

The apparatus shown in Figs. 22 and 23 can be employed in order to divide the lengths 166, 167 into strips of the desired width. This consists of two carriers 180, 181 between which the wire network 182 passes. On the carrier 180 there is or are provided one or more movable knives 183 and corresponding counter-blades 184 on the carrier 181, the counter-blades being fixed by screws, 185 or 186 to the carriers therefor. The number of blades 183 and counter-blades 184 on the carriers depends on the desired sub-division of the wire netting 183. The blade 183 is actuated by pressure springs 187 which draw it back. The blade shaft carries at the end a roller 188 each which lies within the range of movement of an eccentric 189. These eccentrics 189 are adjustably mounted on the shaft 190 which is itself carried on the framework 191. The shaft 190 is driven from the motor 114 through suitable transmission gearing. By means of the rotation of the eccentrics the blades 183 are reciprocated and thus divide wires lying between them on the counter-blades 184.

The size of the meshes of the wire netting to be produced can be varied within wide limits. Firstly it is possible to vary the interval between the longitudinal wires by arranging the guiding rollers 108, 109 at different intervals from each other for example by the arrangement of fixing screws 193 (Fig. 20). The elongated hole of the wire ring 180 of the fixing bolt holds the bearing part 194 which at the upper and lower ends carries the guiding rollers 108, 109.

The number of the longitudinal wires is obviously also to be chosen in accordance with the spacing of the guiding rollers 108, 109.

The spacing of the transverse wires from each other can be controlled by varying the speed with which the longitudinal wire means 107 is drawn over the welding bed, that is, by varying the speed of rotation of the friction roller 172 (Fig. 15), as well as by varying the speed of rotation of the wheel member 110 which carries the reels or coils for the transverse wires. According to the extent of the desired spacing of the transverse wires from each other the flat part 132 of the guiding slide will be varied by releasing the screw 137 (Fig. 20).

This last method of adjustment has the advantage that the form of the meshes is not altered whilst the variation of the speed of advancement of the longitudinal wires leads in some cases to the formation of rhombic meshes.

In Fig. 18 there is shown diagrammatically a form of construction for the electrical connection of the apparatus. The welding current at the usual potential is taken from the network RST.

The phase R is connected by the connection 200 with the sliding contact 201 which contact is made with a slip ring 202 which is provided on the wheel member 110 and rotates with the latter. From the slip ring 202 the connection 203 leads to the primary terminal 204 of the transformer 205. The other primary pole of the transformer is connected by the connection 207 with the slip ring 208 which likewise rotates with the wheel member 210. From this the connection 209 leads to the switch 210 the other side of which is connected with the phase S.

The secondary side of the transformer 205 is connected by leads 152 with the pressure rollers 139, 140.

From the contact piece 148 the connection 211 leads to a terminal 212 which co-operates with the slip ring 213 which rotates with the wheel member 110.

On the slip ring 213 there engages sliding contact 214 which is connected by the connection 215 with the winding 216 of the switch 210 which is also connected with the phase T.

The neutral feeder O is connected by the connection 217 to the slip ring 218 by a sliding contact. The sliding contact 218 is finally connected by the connection 219 to the contact piece 147.

When during the rotation of the wheel member 110 for example the pressure roller 139 rolls from one electrode the lever 144 pivots about the axis 142 whilst the roller 139 engages in the intermediate space to the next electrode. By this pivotal movement (counterclockwise) the switch 147, 148 is closed and the coil 216 is thus energised so that the switch 210 is closed and primary voltage supplied to the transformer 204.

At this moment however, the pressure roller 139 has already passed on to the next welding electrode and has pressed the latter down so that at the moment of depression of the welding electrode the welding current flows and directly afterwards is again interrupted by opening the switch 147, 148 or the switch 210.

It is essential for the production of uniformly constructed wire network that the longitudinal wires shall be drawn with exactly equal spacing between them over the welding support. This requirement can only be fulfilled if the guide rollers 108, 109 for the longitudinal wires are axially adjustable.

Figure 24:
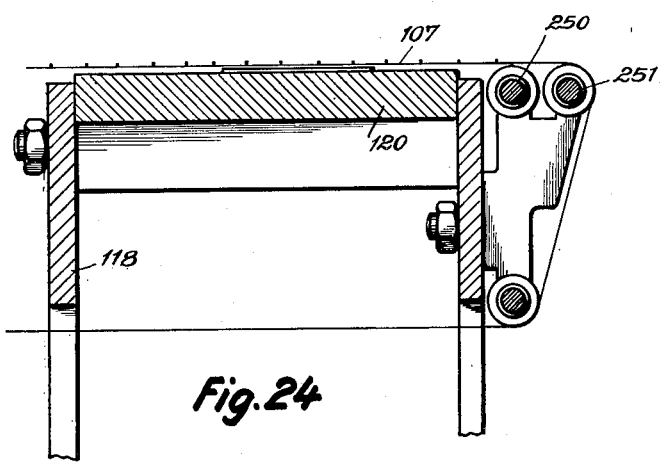
Fig. 24 shows in side elevation another form of construction of the guiding rollers for the longitudinal wires.
Figure 25:
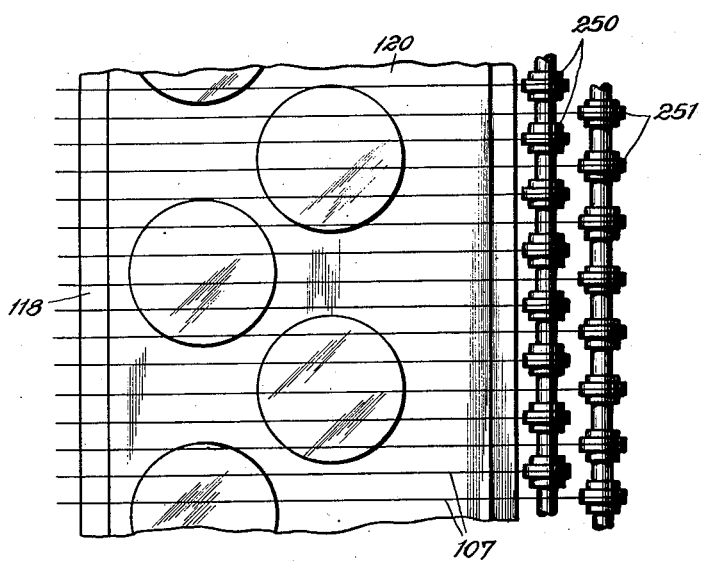
Fig. 25 shows finally the same arrangement in plan.

With wire network of small mesh width this requirement is preferably fulfilled with the apparatus shown in Figs. 24 and 25.

The upper guide rollers 250, 251, which correspond to the guide rollers 109 according to Fig. 20 are here arranged in several rows for example as illustrated, in two rows. In this way there is sufficient space between adjacent rollers 250 and 251 to enable the rollers 250, 251 to be axially adjusted independently of each other. It is thus possible to employ the apparatus according to the invention for wire netting of practically any desired mesh width.

We claim:

1. An apparatus for making wire netting including a revoluble wheel member having an annular fixed welding plate connected to one side thereof, said plate being provided with circumferentially spaced recesses in the outer surface thereof, movable welding supports mounted in said recesses, an annular series of movable electrodes spaced outwardly from said supports, a guiding member positioned above said welding member, means for feeding spaced longitudinally disposed wires over said support and said guiding member, means for moving spaced transversely disposed wires externally over the longitudinal wires before the latter reaches the guiding member, and means for moving the electrodes to weld the transverse wires to the longitudinal wires at their points of intersection.

2. An apparatus for making wire netting as called for in claim 1 in which the guiding member is provided with spaced grooves for receiving the longitudinal wires, and means are provided for pivotally connecting the guiding member to said wheel member.

3. An apparatus for making wire netting including a support having a curved recess in its upper surface, a welding member movably mounted in said recess, a movable electrode above said member, means for moving spaced longitudinally disposed wires over said support and between said welding member and said electrode, means for moving spaced transversely disposed wires externally over the longitudinal wires before the latter pass the electrodes, and means for moving the electrode to weld the transverse wires to the longitudinal wires at their points of intersection.

4. A process for the manufacturing of wire netting formed of longitudinal and transverse wires which includes continuously winding spaced longitudinally disposed wires around a support, winding spaced transversely disposed wires externally around the longitudinal wires, welding the longitudinal and transverse wires at their points of intersection and in such a manner as to form a tubular netting, cutting the tubular netting to form separate curved parts, flattening the curved parts, then winding the flat netting to form a roll, moving the longitudinal wires obliquely over the welding support and over guide rollers at an angle to the axis of the guide rollers which is equal to a right angle less the angle of inclination of the helical lines of the transverse wires, so as to provide an exact square netting of the longitudinal wires.

5. An apparatus for making wire netting including an annular stationary bed, an annular member concentric with said bed, movable electrodes carried by said annular member and arranged to engage the outer surface of said bed, means for feeding spaced longitudinally disposed wires over the outer surface of said bed, means for feeding transversely disposed wires over the longitudinal wires in front of the electrodes, means for moving the electrodes so as to weld the transverse wires to the longitudinal wires at their points of intersection, yieldably mounted pressure rollers arranged to engage said electrodes to move the latter in welding engagement with the wire netting, means for supplying electric current to the electrodes, and means operable by the movement of the electrodes for controlling the flow of current.

References Cited in the file of this patent

UNITED STATES PATENTS

| | | |
|---|---|---|
| 1,198,351 | Heany | Sept. 12, 1916 |
| 1,842,120 | Riley | Jan. 19, 1932 |
| 1,878,760 | Cosgrove | Sept. 20, 1932 |
| 2,046,461 | Johnson | July 7, 1936 |
| 2,050,832 | Edwards | Aug. 7, 1936 |
| 2,137,257 | White | Nov. 22, 1938 |
| 2,187,129 | Kramer | Jan. 16, 1940 |
| 2,327,686 | Williams | Aug. 24, 1943 |
| 2,332,022 | Southwick | Oct. 19, 1943 |
| 2,411,988 | Drieschman | Dec. 3, 1946 |
| 2,473,859 | Butler | June 21, 1949 |